United States Patent [19]

Doi et al.

[11] Patent Number: 4,898,794

[45] Date of Patent: Feb. 6, 1990

[54] HYDROGEN ABSORBING NI,ZR-BASED ALLOY AND RECHARGEABLE ALKALINE BATTERY

[75] Inventors: Hidekazu Doi, Omiya; Ritsue Yabuki, Iwatsuki, both of Japan

[73] Assignee: Mitsubishi Metal Corporation, Tokyo, Japan

[21] Appl. No.: 380,608

[22] Filed: Jul. 17, 1989

[30] Foreign Application Priority Data

Dec. 27, 1988 [JP] Japan ................................. 63-330423
Dec. 27, 1988 [JP] Japan ................................. 63-330424

[51] Int. Cl.$^4$ ..................... H07M 4/36; C22C 19/03; C22C 30/00
[52] U.S. Cl. ........................................ 429/59; 429/101; 429/223; 420/446; 420/458; 420/459; 420/460; 420/451; 420/581; 420/582; 420/584; 420/900
[58] Field of Search ................. 420/442, 446, 458–460, 420/451, 900, 581–584; 429/101, 59, 223

[56] References Cited

U.S. PATENT DOCUMENTS

| | | | |
|---|---|---|---|
| 4,668,310 | 5/1987 | Kudo et al. | 420/442 X |
| 4,668,424 | 5/1987 | Sandrock | 420/900 X |
| 4,728,586 | 3/1988 | Venkatesan | 420/900 X |

FOREIGN PATENT DOCUMENTS

| | | | |
|---|---|---|---|
| 293660 | 12/1988 | European Pat. Off. | 429/101 |
| 3151712 | 6/1984 | Fed. Rep. of Germany | 420/900 |
| 57-101633 | 6/1982 | Japan | 420/459 |

*Primary Examiner*—Stephen J. Kalafut
*Attorney, Agent, or Firm*—Oblon, Spivak, McClelland, Maier & Neustadt

[57] ABSTRACT

A hydrogen absorbing Ni,Zr-based alloy comprising 5 to 20% by weight of titanium (Ti), 10 to 37% by weight of zirconium (Zr), 5 to 30% by weight of manganese (Mn), 0.01 to 15% by weight of tungsten (W), 6 to 30% by weight of iron (Fe), and optionally at least one of 0.1 to 7% by weight of Cu, 0.05 to 6% by weight of Cr and 0.01 to 5% by weight of Al, and balance nickel (Ni) and unavoidable impurities; and a sealed Ni-hydrogen rechargeable battery comprising a negative electrode provided with a hydrogen absorbing alloy as an active material, an Ni positive electrode, a separator and an alkaline electrolytic solution, wherein the hydrogen absorbing alloy is composed of such hydrogen absorbing Ni,Zr-based alloy.

14 Claims, No Drawings

HYDROGEN ABSORBING NI,ZR-BASED ALLOY AND RECHARGEABLE ALKALINE BATTERY

BACKGROUND OF THE INVENTION

1. Field of the Invention

The present invention relates to hydrogen absorbing Ni,Zr-based alloys and sealed rechargeable alkaline batteries or cells containing such alloys as an active material for their negative electrodes.

2. Description of Prior Art

Generally, sealed Ni-hydrogen rechargeable batteries include a negative electrode provided with a hydrogen absorbing alloy as an active material, an Ni positive electrode, a separator and an alkaline electrolytic solution. The hydrogen absorbing alloys constituting the negative electrode are desired to have the following characteristics, for example.

(a) They have high capability to absorb and release hydrogen.

(b) They show a relatively low equilibrium hydrogen dissociation pressure (which corresponds to the plateau pressure on PCT curve at a temperature in the vicinity of room temperature) as low as not higher than 5 atm.

(c) They exhibit high corrosion resistance and high durability or resistance to deterioration or aging.

(d) They show high hydrogen oxidizing capability (or catalytic activity).

(e) They are hardly converted to fine powder when absorption and release of hydrogen are repeated.

(f) They cause no or less environmental pollution.

(g) Their cost is low.

As is well known in the art, sealed Ni-hydrogen rechargeable batteries using as an active material such hydrogen absorbing alloy as having the above-listed characteristics could exhibit various desirable characteristics such as large discharge capability, long lifetime of repeated cycle of charging and discharging, excellent rapid charging and discharging characteristics, and low self-discharge.

Therefore, research and development have been made increasingly on hydrogen absorbing alloys suitable for use as an active material in batteries, particularly sealed Ni-hydrogen rechargeable batteries and various hydrogen absorbing alloys have been proposed as described, for example, in Nos. JP-A-61-45563 and JP-A-60-241652.

However, none of the hydrogen absorbing alloys thus far proposed does always satisfy all the characteristics required for as the active material for the negative electrodes in sealed Ni-hydrogen rechargeable batteries, and therefore further development is now desired.

SUMMARY OF THE INVENTION

Therefore, an object of the present invention is to provide a hydrogen absorbing alloy satisfying the above-described characteristics or requirements.

Another object of the present invention is to provide a sealed Ni-hydrogen rechargeable battery containing such a hydrogen absorbing alloy as an active material.

As the result of intensive research, it has now been found that use of tungsten and rather high content of iron gives rise to hydrogen absorbing alloys which meet the above requirements, and the present invention is based on the discovery.

The present invention provides a hydrogen absorbing Ni,Zr-based alloy comprising 5 to 20% by weight of titanium (Ti), 10 to 37% by weight of zirconium (Zr), 5 to 30% by weight of manganese (Mn), 0.01 to 15% by weight of tungsten (W), 6 to 30% by weight of iron (Fe), and balance nickel (Ni) and unavoidable impurities.

Also, the present invention provides a sealed Ni-hydrogen rechargeable battery comprising a negative electrode provided with a hydrogen absorbing alloy as an active material, an Ni positive electrode, a separator and an alkaline electrolytic solution, wherein the hydrogen absorbing alloy is composed of a hydrogen absorbing Ni,Zr-based alloy comprising 5 to 20% by weight of titanium (Ti), 10 to 37% by weight of zirconium (Zr), 5 to 30% by weight of manganese (Mn), 0.01 to 15% by weight of tungsten (W), 6 to 30% by weight of iron (Fe), and balance unavoidable impurities.

The hydrogen absorbing Ni,Zr-based alloy of the present invention exhibits the above-described characteristics required for when used as an active material for the negative electrode of sealed Ni-hydrogen rechargeable batteries. The Ni-hydrogen rechargeable battery of the present invention has high energy density and high discharge capability as well as prolonged lifetime, shows low self discharge, realizes charge-discharge at high efficiency, causes no environmental pollution, and incurs low cost.

DETAILED DESCRIPTION OF THE INVENTION

The hydrogen absorbing Ni,Zr-based alloy of the present invention may contain at least one of 0.1 to 7% by weight of Cu and 0.05% by weight of Cr and 0.01 to 5% by weight of Al.

Hereinafter, the components of the hydrogen absorbing Ni,Zr-based alloy of the present invention will be described in detail.

(a) Titanium (Ti) and Zirconium (Zr)

Ti and Zr together not only endow the alloy with hydrogen absorption and release capabilities but also lower the equilibrium hydrogen dissociation pressure (plateau pressure) at room temperature to a level, e.g., as low as 5 atm. However, when the contents of Ti and Zr are less than 5% by weight and less than 10% by weight, respectively, desired effects are not obtained. On the other hand, when the content of Ti exceeds 20% by weight, the equilibrium hydrogen dissociation pressure increases to an undesirably high level, e.g. as high as 5 atm or more, resulting in that in order to obtain high discharge capability, high hydrogen dissociation pressure is required, which is undesirable to rechargeable batteries. When the content of Zr exceeds 37% by weight, the hydrogen absorption and release capabilities decreases to a level practically unacceptable although it causes no problem from the viewpoint of dependency of the discharge capability on the hydrogen dissociation pressure. Therefore, the contents of Ti and Zr are set up for 5 to 20% by weight, and 10 to 37% by weight, respectively.

(b) Manganese (Mn)

Mn is effective in improving the hydrogen absorption and release capabilities of the alloy and also increases the corrosion resistance and durability of the alloy in alkaline electrolytic solutions. Mn is also effective in preventing the self discharge of batteries when the alloy is used as an active material for the negative electrode of rechargeable batteries. The effects of Mn are not fully obtained when its content is below 5% by weight, and on the other hand the hydrogen absorption and release characteristics is deteriorated when the content of Mn exceeds 30% by weight. For this reason, the content of Mn ranges from 5 to 30% by weight.

(c) Tungsten (W)

W adds to further improve the corrosion resistance of the alloy in the alkaline electrolytic solution constituting the rechargeable battery and also improve the durability of the alloy. It prevents the self discharge of the alloy upon practical use as the active material. However, when the content of W is below 0.01% by weight, the desired effects are not obtained. On the other hand, when it exceeds 15% by weight, the hydrogen absorption and release capabilities are deteriorated. Therefore, the content of W is set up to 0.01 to 15% by weight.

(d) Iron (Fe)

Fe is used in the hydrogen absorbing alloy of the present invention not only because it has an activity of further stabilizing hydrides, thereby contributing to the stabilization of the performance of the rechargeable batteries but also because it is advantageous from the economical viewpoint since it can be used as a component which partly substitutes for Ni without deteriorating the effects given by Ni. When the content of Fe is below 6% by weight, the desired effects are not obtained. On the other hand, the corrosion resistance of the alloy decreases to promote the self discharge of the rechargeable battery when it is above 30% by weight. Thus, the content of Fe is selected to be 6 to 30% by weight.

(e) Copper (Cu)

Cu has an activity of further improving the adjustment of the equilibrium hydrogen dissciation pressure without deteriorating the hydrogen absorption and release capabilities of the alloy. However, in order to obtain the desired effects, the content of Cu is not below 0.1% by weight. On the other hand, it does not exceed 7% by weight because the hydrogen absorption and release capabilities are deteriorated. Therefore, the content of Cu is set up to 0.1 to 7% by weight.

(f) Chromium (Cr) and Aluminum (Al)

Al and Cr have an activity of further improving the corrosion resistance of the alloy in alkaline electrolytic solutions without deteriorating the hydrogen absorption and release capabilities of the alloy. However, the desired effects are not obtained when the content of Cr is below 0.05% by weight and that of Al is below 0.01% by weight while the hydrogen absorption and release capabilities decreases considerably when the content of Cr and Al exceeds 6% by weight and 5% by weight, respectively. Therefore, the content of Cr is set up to 0.05 to 6% by weight, and that of Al to 0.01 to 5% by weight.

The composition of the alloy may be varied suitably within the above-described general range.

Typical examples of the hydrogen absorbing Ni,Zr-based alloy of the present invention include the following alloys.

(i) Hydrogen absorbing Ni,Zr-based alloy comprising 5 to 20% by weight of Ti, 10 to 37% by weight of Zr, 5 to 30% by weight of Mn, 0.01 to 15% by weight of W, 6 to 30% by weight of Fe, and balance Ni and unavoidable impurities.

(ii) Hydrogen absorbing Ni,Zr-based alloy containing 0.1 to 7% by weight of Cu in addition to the composition of the Ni,Zr-based alloy (i).

(iii) Hydrogen absorbing Ni,Zr-based alloy containing 0.05 to 6% by weight of Cr in addition to the composition of the Ni,Zr-based alloy (i).

(iv) Hydrogen absorbing Ni,Zr-based alloy containing 0.01 to 5% by weight of Al in addition to the composition of the Ni,Zr-based alloy (i).

(v) Hydrogen absorbing Ni,Zr-based alloy containing any two of 0.1 to 7% by weight of Cu, 0.05 to 6% by weight of Cr and 0.01 to 5% by weight of Al in addition to the composition of the Ni,Zr-based alloy (i).

(vi) Hydrogen absorbing Ni,Zr-based alloy containing 0.1 to 7% by weight of Cu, 0.05 to 6% by weight of Cr and 0.01 to 5% by weight of Al in addition to the composition of the Ni,Zr-based alloy (i).

The sealed Ni-hydrogen rechargeable battery of the present invention is characterized by the use of the above-described hydrogen absorbing Ni,Zr-based alloys as the active material for the negative electrode. Basic constructions or compositions of other elements or members of the rechargeable battery such as electrodes, separator, alkaline electrolytic solution may be the same as used in the conventional sealed Ni-hydrogen rechargeable batteries.

In the sealed Ni-hydrogen rechargeable battery of the present invention, there can be used various types of hydrogen absorbing NiZr-based alloys including those described in (i) to (vi) above.

The sealed Ni-hydrogen rechargeable batteries of the present invention can be manufactured in the conventional manner. For example, the elements or metals are melted by ordinary melting method to prepare molten Ni alloys having predetermined compositions, which are then cast into ingots. The ingots are then pulverized to obtain crude powders, which are subsequently ground to convert them into fine powders. The fine alloy powders are mixed with a binder and other additives, if desired, and kneaded to obtain pastes. The pastes are uniformly filled into nonwoven Ni whisker or Ni foam sheets and the resulting composites are dried and pressed, if desired, to obtain sheet like products which can serve as negative electrodes. The negative electrodes thus produced can be assembled together with positive electrodes and alkaline electrolytic solutions commonly used to give sealed Ni-hydrogen rechargeable batteries.

The size of the negative electrode in the form of sheet, the amount of the hydrogen absorbing Ni,Zr-based alloys as the active material filled in the electrode, and the capability of the negative electrodes are not restricted in the ranges of shown in the following Examples.

EXAMPLES

The present invention will be described in greater detail with reference to the following examples and comparative examples. However, the present invention should not be construed as being limited to the examples.

Unless otherwise described specifically percentages are all by weight (except for % residual capability).

EXAMPLE 1

(a) Preparation of Ni,Zr-based Alloy Powders

Molten Ni alloys having the respective compositions shown in Table 1 were prepared in argon (Ar) atmosphere using a conventional high frequency induction furnace, and cast in a copper mold to form ingots. The ingots were annealed by holding them in Ar atmosphere at a predetermined temperature in the range of from 900° to 1000° C. for 5 hours, followed by crushing them into crude powders having a particle size not larger than 2 mm using a jaw crusher. The crude powders were further ground to fine powders having a particle size of not larger than 350 mesh using a ball mill to obtain hydrogen absorbing Ni,Zr-based alloy samples Nos. A-1 to A-20, comparative samples Nos. a-1 to a-9 and conventional sample No. a'.

(b) Manufacture of Ni-Hydrogen Rechargeable Batteries

The hydrogen absorbing Ni,Zr-based alloy powders each were mixed with a 2% aqueous polyvinyl alcohol (PVA) solution to obtain pastes, each of which was then filled into an Ni whisker nonwoven fabric which was commercially available and had a porosity of 95%. The paste-filled nonwoven fabric composites were dried and pressed to form thin sheet-like pieces having a plane size of 42 mm×35 mm and a thickness of 0.60 to 0.65 mm. The amount of the active material filled in the fabric was about 2.8 g per piece. A thin Ni sheet serving as a lead was attached by welding to each of the paste-filled fabric piece at one of the edges thereof to form a negative electrode. On the other hand, two sintered Ni oxides sheets having the same size as the negative electrode were provided as a positive electrode, and an open type Ni-hydrogen rechargeable battery was produced by arranging the Ni oxides positive electrodes and the negative electrode in an appropriate vessel so that the Ni oxides positive electrodes sandwich the negative electrode and charging a 30% aqueous KOH solution in the vessel.

In the thus-obtained open type rechargeable batteries, the capability of the positive electrodes were made significantly higher than that of the negative electrodes to enable the determination of the capability of the negative electrodes.

The comparative hydrogen absorbing Ni,Zr-based alloy samples Nos. a-1 to a-9 had compositions outside the scope of the present invention. More particularly, the contents of the component elements marked by a symbol (*) shown in Table 3 were outside the scope of the present invention.

(c) Determination of Discharge Capability

The thus-obtained rechargeable batteries with different active materials were subjected to charge-discharge tests under the conditions of a discharge rate: 0.2 C (Coulomb), and a charge amount: 130% of the capability of the negative electrode. After 100 cycles, 200 cycles or 300 cycles of charge-discharge (one cycle consisting of one charge and one discharge), the respective discharge capabilities of the negative electrodes were determined.

Furthermore, positive electrode-capacity controlled AA size (capability: 1000 mAh) sealed Ni-hydrogen rechargeable batteries were assembled using the above-described hydrogen absorbing Ni,Zr-based alloy powders as active materials for the negative electrodes, and subjected to self discharge tests. The results obtained are shown in Tables 2 and 4.

(d) Self Discharge Test

In addition, using the hydrogen absorbing Ni,Zr-based alloy powders shown in Tables 1 and 3, different negative electrode sheets were produced under the same conditions as the above-described negative electrodes used for the charge-discharge tests except that the size of the negative electrode sheets was changed to a plane size of 90 mm×40 mm and a thickness of 0.60 to 0.65 mm and the capability of the negative electrode was changed to 1,450 to 1,500 mAh (the amount of active material to be filled: about 6 g). On the other hand, positive electrodes were produced by filling nickel hydroxide ($Ni(OH)_2$) as active material into nonwoven fabric of Ni whisker having a porosity of 95%, drying and pressing the filled nonwoven fabric to form nonwoven fabric composites having a plane size of 70 mm×40 mm and a thickness of 0.65 to 0.70 mm (capability: 1,000 to 1,050 mAh), each of which which was provided with a lead. The negative and positive electrodes thus produced together with an electrolytic solution were arranged in a spiral form together with an intervening separator, and these members were held together with an electrolytic solution in a case which served also as a negative terminal to form various sealed Ni-hydrogen rechargeable batteries. In the batteries, the capability of the negative electrode was made larger than that of the positive electrode in order to construct positive electrode-capacity controlled rechargeable batteries.

The self discharge tests were performed by charging the sealed Ni-hydrogen rechargeable batteries at a rate of 0.2 C (200 mA) at room temperature for 7 hours, and leaving the batteries to stand in a thermostatic chamber kept at a temperature of 45° C. for 1 week or 2 weeks under the conditions of open circuit, i.e., without loads on the battery), followed by discharging at a rate of 0.2 C (200 mA) at room temperature. Then, percent residual capability was calculated for each test. The results obtained are shown in Tables 2 and 4.

In addition, the hydrogen absorbing alloys were tested for corrosion resistance according to the so-called Huey test. Test samples were made by cutting the ingots of the various hydrogen absorbed Ni,Zr-based alloys and embedding them into a plastic resin, followed by grinding the surface to be corroded with Emery Paper No. 600. The thus-finished samples were introduced into an Erlenmeyer flask provided with a cold finger type condenser and held in a boiling 30% aqueous KOH solution for 144 hours to perform corrosion tests to determine the corrosion resistance of the alloy to an alkaline electrolytic solution. The results obtained are also shown in Tables 2 and 4.

TABLE 1

| | COMPOSITION OF HYDROGEN ABSORBING ALLOY (wt. %) | | | | | | | |
|---|---|---|---|---|---|---|---|---|
| SAMPLE | Ti | Zr | Mn | W | Fe | Cr | Al | Ni + Imp |
| A-1 | 5.2 | 29.6 | 16.0 | 0.10 | 13.1 | — | — | Bal |
| A-2 | 10.3 | 29.5 | 16.1 | 0.13 | 13.0 | — | — | Bal |

TABLE 1-continued

| | COMPOSITION OF HYDROGEN ABSORBING ALLOY (wt. %) | | | | | | | |
|---|---|---|---|---|---|---|---|---|
| SAMPLE | Ti | Zr | Mn | W | Fe | Cr | Al | Ni + Imp |
| A-3 | 19.4 | 29.4 | 16.2 | 0.11 | 13.0 | — | — | Bal |
| A-4 | 10.4 | 10.3 | 16.4 | 5.4 | 13.4 | — | — | Bal |
| A-5 | 10.7 | 36.4 | 16.5 | 5.1 | 13.1 | — | — | Bal |
| A-6 | 10.6 | 29.5 | 5.1 | 11.4 | 13.2 | — | — | Bal |
| A-7 | 10.5 | 29.3 | 29.7 | 11.7 | 13.0 | — | — | Bal |
| A-8 | 10.4 | 29.6 | 16.6 | 0.031 | 13.2 | — | — | Bal |
| A-9 | 10.6 | 29.5 | 16.7 | 14.6 | 13.4 | — | — | Bal |
| A-10 | 10.6 | 29.4 | 16.8 | 7.3 | 6.2 | — | — | Bal |
| A-11 | 10.3 | 29.3 | 16.4 | 7.5 | 29.6 | — | — | Bal |
| A-12 | 10.7 | 29.6 | 16.5 | 7.2 | 10.8 | — | 0.013 | Bal |
| A-13 | 10.5 | 29.5 | 16.3 | 7.1 | 10.4 | — | 2.56 | Bal |
| A-14 | 10.4 | 29.4 | 16.4 | 7.5 | 10.6 | — | 4.59 | Bal |
| A-15 | 10.3 | 29.3 | 16.5 | 7.4 | 10.2 | 0.061 | — | Bal |
| A-16 | 10.5 | 29.3 | 16.4 | 7.3 | 10.5 | 3.08 | — | Bal |
| A-17 | 10.6 | 29.4 | 16.6 | 7.0 | 10.3 | 5.76 | — | Bal |
| A-18 | 10.4 | 29.3 | 16.3 | 7.1 | 10.2 | 0.11 | 0.08 | Bal |
| A-19 | 10.6 | 29.5 | 16.2 | 7.3 | 10.5 | 1.32 | 1.16 | Bal |
| A-20 | 10.7 | 29.6 | 16.5 | 7.4 | 10.3 | 2.42 | 2.08 | Bal |

Notes:
"Imp" stands for "impurities".
"Bal" stands for "balance".

TABLE 2

| | CHARACTERISTICS OF BATTERY | | | | | |
|---|---|---|---|---|---|---|
| | DISCHARGE CAPABILITY(mAh) | | | RESIDUAL CAPABILITY (%) | | |
| SAMPLE | AFTER 100 C | AFTER 200 C | AFTER 300 C | AFTER 1 WEEK | AFTER 2 WEEKS | REDUCTION IN WEIGHT CORROSION (mg/cm²/hr) |
| A-1 | 274 | 265 | 255 | 72 | 64 | 6.7 |
| A-2 | 279 | 268 | 260 | 73 | 65 | 5.8 |
| A-3 | 285 | 275 | 266 | 72 | 62 | 3.4 |
| A-4 | 267 | 258 | 250 | 72 | 63 | 2.8 |
| A-5 | 294 | 285 | 274 | 75 | 67 | 2.0 |
| A-6 | 265 | 256 | 248 | 74 | 65 | 1.3 |
| A-7 | 264 | 255 | 247 | 73 | 64 | 0.9 |
| A-8 | 258 | 249 | 243 | 75 | 66 | 8.4 |
| A-9 | 275 | 266 | 257 | 74 | 67 | 0.3 |
| A-10 | 271 | 262 | 254 | 72 | 62 | 3.5 |
| A-11 | 264 | 255 | 246 | 70 | 61 | 7.1 |
| A-12 | 266 | 257 | 250 | 70 | 62 | 2.6 |
| A-13 | 258 | 253 | 244 | 71 | 63 | 1.2 |
| A-14 | 255 | 247 | 240 | 72 | 63 | 0.8 |
| A-15 | 261 | 253 | 246 | 71 | 61 | 1.9 |
| A-16 | 259 | 250 | 243 | 72 | 63 | 1.0 |
| A-17 | 257 | 248 | 241 | 73 | 63 | 0.4 |
| A-18 | 268 | 259 | 251 | 71 | 63 | 2.0 |
| A-19 | 269 | 263 | 253 | 72 | 64 | 1.2 |
| A-20 | 271 | 266 | 255 | 74 | 66 | 0.5 |

Note:
"C" stands for "cycles".

TABLE 3

| | COMPOSITION OF HYDROGEN ABSORBING ALLOY (wt. %) | | | | | | | |
|---|---|---|---|---|---|---|---|---|
| SAMPLE | Ti | Zr | Mn | W | Fe | Cr | Al | Ni + Imp |
| a-1 | 3.4* | 29.3 | 15.9 | 0.11 | 13.0 | — | — | Bal |
| a-2 | 21.8* | 29.5 | 16.1 | 0.12 | 13.1 | — | — | Bal |
| a-3 | 10.5 | 8.4* | 16.5 | 5.4 | 13.2 | — | — | Bal |
| a-4 | 10.6 | 39.6* | 16.3 | 5.2 | 13.4 | — | — | Bal |
| a-5 | 10.5 | 29.4 | 3.2* | 11.3 | 13.1 | — | — | Bal |
| a-6 | 10.6 | 29.2 | 32.1* | 11.6 | 13.3 | — | — | Bal |
| a-7 | 10.5 | 29.4 | 16.5 | —* | 13.4 | — | — | Bal |
| a-8 | 10.4 | 29.6 | 16.3 | 16.8* | 13.2 | — | — | Bal |
| a-9 | 10.6 | 29.3 | 16.6 | 7.6 | 33.4* | — | — | Bal |
| a' | 14.2 | 24.1 | — | — | — | — | (V: 30.5) | Bal |

Notes:
"Imp" stands for "impurities".
"Bal" stands for "balance".

TABLE 4

| SAMPLE | DISCHARGE CAPABILITY (mAh) AFTER 100 C | AFTER 200 C | AFTER 300 C | RESIDUAL CAPABILITY (%) AFTER 1 WEEK | AFTER 2 WEEKS | REDUCTION IN WEIGHT CORROSION (mg/cm$^2$/hr) |
|---|---|---|---|---|---|---|
| a-1 | 236 | 218 | 209 | 62 | 51 | 11.3 |
| a-2 | 268 | 247 | 118 | 57 | 45 | 2.6 |
| a-3 | 245 | 226 | 101 | 55 | 44 | 3.8 |
| a-4 | 243 | 227 | 116 | 65 | 52 | 1.6 |
| a-5 | 244 | 225 | 120 | 56 | 47 | 2.9 |
| a-6 | 192 | 171 | 59 | 69 | 54 | 0.7 |
| a-7 | 224 | 210 | 196 | 54 | 50 | 12.6 |
| a-8 | 248 | 237 | 219 | 76 | 68 | 0.1 |
| a-9 | 251 | 247 | 235 | 53 | 41 | 9.2 |
| a' | 270 | 254 | 241 | 19 | 5 | 12.0 |

Note:
"C" stands for "cycles".

Tables 1 and 2 clearly show that the hydrogen absorbing alloy samples Nos. A-1 to A-20 of the present invention showed excellent corrosion resistance to alkaline electrolytic solutions as compared to the conventional hydrogen absorbing alloy. The tables also show that the rechargeable batteries provided with the hydrogen absorbing Ni,Zr-based alloy samples Nos. A-1 to A-20 of the present invention as the active material for the negative electrode each had a high capability and showed considerably low reduction in the capability after repeated charge-discharge cycles as compared with the rechargeable batteries provided with the conventional hydrogen absorbing Ni,Zr-based alloy a' shown in Tables 3 and 4.

From the results shown in Tables 3 and 4, tendencies are observed that the corrosion resistance of the alloys to alkaline electrolytic solutions decreased and the rechargeable batteries provided with the alloys as the active material for the negative electrode showed deterioration in the discharge capability and self discharge characteristics when one or more components constituting the hydrogen absorbing Ni,Zr-based alloys Nos. a-1 to a-9 were present in amounts outside the scope of the present invention.

EXAMPLE 2

The same procedures as Example 1 were repeated to produce rechargeable batteries and test them except that the alloys shown in Tables 5 and 7 were used instead of those shown in Tables 1 and 3 and that the respective discharge capabilities of the negative electrodes were determined after 120 cycles, 240 cycles or 360 cycles of charge-discharge instead of after 100 cycles, 200 cycles or 300 cycles shown in Tables 1 and 3. The results obtained are shown in Tables 6 and 8.

TABLE 5

| SAMPLE | Ti | Zr | Mn | W | Fe | Cu | Cr | Al | Ni + Imp |
|---|---|---|---|---|---|---|---|---|---|
| B-1 | 5.3 | 29.4 | 16.2 | 0.13 | 13.2 | 3.6 | — | — | Bal |
| B-2 | 10.6 | 29.7 | 16.3 | 0.12 | 13.3 | 3.5 | — | — | Bal |
| B-3 | 19.5 | 29.5 | 16.5 | 0.14 | 13.1 | 3.3 | — | — | Bal |
| B-4 | 10.5 | 10.6 | 16.2 | 5.4 | 13.2 | 3.4 | — | — | Bal |
| B-5 | 10.7 | 36.4 | 16.3 | 5.2 | 13.4 | 3.6 | — | — | Bal |
| B-6 | 10.6 | 29.6 | 5.2 | 11.5 | 13.5 | 3.5 | — | — | Bal |
| B-7 | 10.7 | 29.8 | 29.6 | 11.4 | 13.4 | 3.1 | — | — | Bal |
| B-8 | 10.5 | 29.4 | 16.4 | 0.041 | 13.1 | 3.3 | — | — | Bal |
| B-9 | 10.3 | 29.8 | 16.6 | 14.5 | 13.2 | 3.4 | — | — | Bal |
| B-10 | 10.6 | 29.6 | 16.8 | 7.4 | 6.3 | 3.7 | — | — | Bal |
| B-11 | 10.4 | 29.7 | 16.3 | 7.3 | 29.4 | 3.5 | — | — | Bal |
| B-12 | 10.5 | 29.4 | 16.2 | 7.6 | 13.0 | 0.21 | — | — | Bal |
| B-13 | 10.4 | 29.2 | 16.4 | 7.4 | 13.1 | 6.5 | — | — | Bal |
| B-14 | 10.6 | 29.8 | 16.3 | 7.2 | 10.1 | 3.6 | 0.054 | — | Bal |
| B-15 | 10.5 | 29.6 | 16.4 | 7.3 | 10.2 | 3.5 | 3.03 | — | Bal |
| B-16 | 10.7 | 29.5 | 16.2 | 7.0 | 10.3 | 3.8 | 5.81 | — | Bal |
| B-17 | 10.3 | 29.2 | 16.4 | 7.6 | 10.7 | 3.5 | — | 0.015 | Bal |
| B-18 | 10.4 | 29.3 | 16.5 | 7.4 | 10.6 | 3.3 | — | 2.48 | Bal |
| B-19 | 10.8 | 29.1 | 16.7 | 7.3 | 10.5 | 3.6 | — | 4.63 | Bal |
| B-20 | 10.7 | 29.4 | 16.5 | 7.2 | 10.4 | 3.5 | 1.63 | 1.22 | Bal |
| B-21 | 10.6 | 29.3 | 16.6 | 7.3 | 10.6 | 3.4 | 4.11 | 3.20 | Bal |

Notes:
"Imp" stands for "impurities".
"Bal" stands for "balance".

TABLE 6

| SAMPLE | DISCHARGE CAPABILITY (mAh) AFTER 120 C | AFTER 240 C | AFTER 360 C | RESIDUAL CAPABILITY (%) AFTER 1 WEEK | AFTER 2 WEEKS | REDUCTION IN WEIGHT CORROSION (mg/cm$^2$/hr) |
|---|---|---|---|---|---|---|
| B-1 | 276 | 266 | 257 | 72 | 65 | 6.3 |
| B-2 | 280 | 270 | 262 | 74 | 66 | 5.4 |
| B-3 | 286 | 277 | 267 | 73 | 64 | 3.2 |
| B-4 | 267 | 259 | 251 | 72 | 63 | 2.6 |

TABLE 6-continued

| | CHARACTERISTICS OF BATTERY | | | | | |
|---|---|---|---|---|---|---|
| | DISCHARGE CAPABILITY (mAh) | | | RESIDUAL CAPABILITY (%) | | |
| SAMPLE | AFTER 120 C | AFTER 240 C | AFTER 360 C | AFTER 1 WEEK | AFTER 2 WEEKS | REDUCTION IN WEIGHT CORROSION (mg/cm$^2$/hr) |
| B-5 | 295 | 285 | 276 | 76 | 68 | 1.9 |
| B-6 | 267 | 258 | 249 | 75 | 66 | 1.2 |
| B-7 | 265 | 256 | 248 | 73 | 65 | 0.9 |
| B-8 | 259 | 250 | 244 | 76 | 67 | 8.1 |
| B-9 | 276 | 268 | 259 | 79 | 68 | 0.2 |
| B-10 | 272 | 264 | 256 | 75 | 64 | 3.3 |
| B-11 | 265 | 257 | 248 | 72 | 62 | 6.7 |
| B-12 | 258 | 256 | 247 | 72 | 61 | 4.0 |
| B-13 | 269 | 261 | 253 | 70 | 60 | 2.6 |
| B-14 | 262 | 254 | 247 | 72 | 64 | 1.8 |
| B-15 | 260 | 252 | 245 | 74 | 65 | 0.9 |
| B-16 | 258 | 249 | 243 | 75 | 66 | 0.3 |
| B-17 | 267 | 259 | 251 | 72 | 64 | 2.4 |
| B-18 | 265 | 251 | 247 | 73 | 65 | 1.8 |
| B-19 | 265 | 248 | 242 | 73 | 65 | 0.6 |
| B-20 | 267 | 253 | 248 | 75 | 67 | 0.4 |
| B-21 | 271 | 262 | 253 | 78 | 69 | 0.2 |

Note: "C" stands for "cycles".

TABLE 7

| | COMPOSITION OF HYDROGEN ABSORBING ALLOY (wt. %) | | | | | | | | |
|---|---|---|---|---|---|---|---|---|---|
| SAMPLE | Ti | Zr | Mn | W | Fe | Cu | Cr | Al | Ni + Imp |
| b-1 | 3.2* | 29.5 | 16.3 | 0.15 | 13.4 | 3.5 | — | — | Bal |
| b-2 | 22.4* | 29.3 | 16.0 | 0.13 | 13.6 | 3.4 | — | — | Bal |
| b-3 | 10.3 | 8.1* | 16.4 | 5.2 | 13.3 | 3.5 | — | — | Bal |
| b-4 | 10.5 | 39.8* | 16.2 | 5.4 | 13.5 | 3.3 | — | — | Bal |
| b-5 | 10.4 | 29.5 | 3.1* | 11.6 | 13.4 | 3.6 | — | — | Bal |
| b-6 | 10.5 | 29.4 | 33.2 | 11.3 | 13.6 | 3.2 | — | — | Bal |
| b-7 | 10.6 | 29.3 | 16.5 | —* | 13.3 | 3.4 | — | — | Bal |
| b-8 | 10.4 | 29.4 | 16.3 | 17.1* | 13.4 | 3.5 | — | — | Bal |
| b-9 | 10.5 | 29.5 | 16.4 | 7.5 | 34.1* | 3.6 | — | — | Bal |
| b-10 | 10.4 | 29.3 | 16.5 | 7.1 | 10.2 | 8.7 | — | — | Bal |
| b' | 14.2 | 24.1 | — | — | — | — | — | (V: 30.5) | Bal |

Notes:
"Imp" stands for "impurities".
"Bal" stands for "balance".

TABLE 8

| | CHARACTERISTICS OF BATTERY | | | | | |
|---|---|---|---|---|---|---|
| | DISCHARGE CAPABILITY (mAh) | | | RESIDUAL CAPABILITY (%) | | |
| SAMPLE | 120 C | AFTER 240 C | AFTER 360 C | AFTER 1 WEEK | AFTER 2 WEEKS | REDUCTION IN WEIGHT CORROSION (mg/cm$^2$/hr) |
| b-1 | 238 | 220 | 211 | 63 | 49 | 10.8 |
| b-2 | 270 | 249 | 120 | 58 | 46 | 2.7 |
| b-3 | 246 | 228 | 103 | 56 | 45 | 3.6 |
| b-4 | 244 | 229 | 118 | 66 | 54 | 1.4 |
| b-5 | 246 | 227 | 123 | 58 | 49 | 2.7 |
| b-6 | 194 | 173 | 61 | 71 | 56 | 0.5 |
| b-7 | 226 | 212 | 197 | 55 | 51 | 12.4 |
| b-8 | 251 | 239 | 221 | 77 | 69 | 0.08 |
| b-9 | 253 | 248 | 236 | 54 | 43 | 9.1 |
| b-10 | 267 | 251 | 238 | 56 | 45 | 2.7 |
| b' | 224 | 210 | 200 | 19 | 5 | 15.2 |

Note:
"C" stands for "cycles".

Tables 5 and 6 clearly show that the hydrogen absorbing alloy samples Nos. B-1 to B-21 of the present invention showed excellent corrosion resistance to alkaline electrolytic solutions as compared to the conventional hydrogen absorbing alloy. The tables also show that the rechargeable batteries provided with the hydrogen absorbing Ni,Zr-based alloy samples Nos. B-1 to B-21 of the present invention as the active material for the negative electrode each had a high capability and showed considerably low reduction in the capability after repeated charge-discharge cycles as compared with the rechargeable batteries provided with the conventional hydrogen absorbing Ni,Zr-based alloy b' shown in Tables 7 and 8.

From the results shown in Tables 6 and 8, tendencies are observed that the corrosion resistance of the alloys to alkaline electrolytic solutions decreased and the rechargeable batteries provided with the alloys as the active material for the negative electrode showed deterioration in both the discharge capability and the self discharge characteristics when one or more components constituting the hydrogen absorbing Ni,Zr-based alloys Nos. b-1 to b-10 were present in amounts outside the scope of the present invention.

What is claimed is:

1. A hydrogen absorbing Ni,Zr-based alloy comprising 5 to 20% by weight of titanium (Ti), 10 to 37% by weight of zirconium (Zr), 5 to 30% by weight of manganese (Mn), 0.01 to 15% by weight of tungsten (W), 6 to 30% by weight of iron (Fe), and balance nickel (Ni) and unavoidable impurities.

2. A hydrogen absorbing Ni,Zr-based alloy as claimed in claim 1, wherein said alloy further contains 0.05 to 6% by weight of Cr.

3. A hydrogen absorbing Ni,Zr-based alloy as claimed in claim 1, wherein said alloy further contains 0.01 to 5% by weight of Al.

4. A hydrogen absorbing Ni,Zr-based alloy as claimed in claim 1, wherein said alloy further contains 0.1 to 7% by weight of Cu.

5. A hydrogen absorbing Ni,Zr-based alloy as claimed in claim 1, wherein said alloy further contains any two of 0.1 to 7% by weight of Cu, 0.05 to 6% by weight of Cr and 0.01 to 5% by weight of Al.

6. A hydrogen absorbing Ni,Zr-based alloy as claimed in claim 1, wherein said alloy further contains 0.1 to 7% by weight of Cu, 0.05 to 6% by weight of Cr and 0.01 to 5% by weight of Al.

7. A hydrogen absorbing Ni,Zr-based alloy as claimed in claim 1, wherein said alloy further contains at least one of 0.1 to 7% by weight of Cu, 0.05 to 6% by weight of Cr and 0.01 to 5% by weight of Al.

8. A sealed Ni-hydrogen rechargeable battery comprising a negative electrode provided with a hydrogen absorbing alloy as an active material, an Ni positive electrode, a separator and an alkaline electrolytic solution, wherein the hydrogen absorbing alloy is composed of a hydrogen absorbing Ni,Zr-based alloy comprising 5 to 20% by weight of titanium (Ti), 10 to 37% by weight of zirconium (Zr), 5 to 30% by weight of manganese (Mn), 0.01 to 15% by weight of tungsten (W), 6 to 30% by weight of iron (Fe), and balance unavoidable impurities.

9. A sealed Ni-hydrogen rechargeable battery as claimed in claim 8, wherein said alloy further contains 0.05 to 6% by weight of Cr.

10. A sealed Ni-hydrogen rechargeable battery as claimed in claim 8, wherein said alloy further contains 0.01 to 5% by weight of Al.

11. A sealed Ni-hydrogen rechargeable battery as claimed in claim 8, wherein said alloy further contains 0.1 to 7% by weight of Cu.

12. A sealed Ni-hydrogen rechargeable battery as claimed in claim 8, wherein said alloy further contains any two of 0.1 to 7% by weight of Cu, 0.05 to 6% by weight of Cr and 0.01 to 5% by weight of Al.

13. A sealed Ni-hydrogen rechargeable battery as claimed in claim 8, wherein said alloy further contains 0.1 to 7% by weight of Cu, 0.05 to 6% by weight of Cr and 0.01 to 5% by weight of Al.

14. A sealed Ni-hydrogen rechargeable battery as claimed in claim 8, wherein said alloy further contains at least one of 0.1 to 7% by weight of Cu, 0.05 to 6% by weight of Cr and 0.01 to 5% by weight of Al.

* * * * *